United States Patent
Bartlett

[11] Patent Number: 6,151,208
[45] Date of Patent: Nov. 21, 2000

[54] WEARABLE COMPUTING DEVICE MOUNTED ON SUPERIOR DORSAL ASPECT OF A HAND

[75] Inventor: Joel F. Bartlett, Los Altos, Calif.

[73] Assignee: Digital Equipment Corporation, Maynard, Mass.

[21] Appl. No.: 09/103,902

[22] Filed: Jun. 24, 1998

[51] Int. Cl.$^7$ .................................................. G06F 1/16
[52] U.S. Cl. ........................................................... 361/683
[58] Field of Search .................................... 361/681, 683; 364/708.1; 235/472, 462

[56] References Cited

U.S. PATENT DOCUMENTS

| | | | |
|---|---|---|---|
| 4,988,981 | 1/1991 | Zimmerman et al. | 340/709 |
| 5,305,181 | 4/1994 | Schultz . | |
| 5,329,106 | 7/1994 | Hone et al. | 235/472 |
| 5,416,730 | 5/1995 | Lookofsky . | |
| 5,444,462 | 8/1995 | Wambach | 245/158 |
| 5,486,112 | 1/1996 | Troudet et al. | 434/250 |
| 5,514,861 | 5/1996 | Swartz et al. | 235/472 |
| 5,587,577 | 12/1996 | Schultz . | |
| 5,714,698 | 2/1998 | Tokioka et al. | 73/865.4 |
| 5,763,865 | 6/1998 | Swift et al. | 235/472 |
| 5,825,675 | 10/1998 | Want et al. | 364/708.1 |

OTHER PUBLICATIONS

Rekimoto; "Tilting Operations for Small Screen Interfaces" Sony Computer Science Laboratory Inc.; pp. 167–168; 1996.

Small et al.; "Graspable Interface Design" MIT Media Laboratory; pp. 1–8.

Rekimoto et al. "The World through the Computer: Computer Augmented Interaction with Real World Environments", http://www.csl.sony.co.jp/person/ {rekimoto, nagao} .html, pp. 29–36 pulled Nov. 14–17, 1995.

C. Verplaetse, "Inertial proprioceptive devices; Self-motion–sensing toys and tools" IBM Systems Journal, vol. 35, Nos. 3&4, pp. 639–650, 1996.

*Primary Examiner*—Lynn D. Feild
*Attorney, Agent, or Firm*—Pennie & Edmonds LLP

[57] ABSTRACT

A handheld computing device is provided, which includes: a motion sensor fixed to the device sensing an orientation of the device and a mounting structure for mounting the device on a superior dorsal aspect of the hand. The device can include an enclosure shaped to conform to the superior dorsal aspect of the hand. The enclosure can be triangular-shaped with rounded vertices. The device can include a display screen for display of data. The mounting structure can include a glove.

5 Claims, 9 Drawing Sheets a

```
A
B
C
D
E
F
G
``` b

```
Smith, Adam
Smith, Bob
Smith, Carl
Smith, Dick
Smith, Ed
Smith, Frank
Smith, Geoff
``` c

```
Smith, Dick
Comdec Corporation
Western Research Laboratory
123 University Avenue
Collegetown, California  12345
(512) 123-4567
dsmith@comdec.com
```

WEARABLE COMPUTING DEVICE MOUNTED ON SUPERIOR DORSAL ASPECT OF A HAND

FIELD OF THE INVENTION

This invention relates generally to wearable devices, and, more particularly, to hand mounted electronic devices with finger-free operation.

BACKGROUND OF THE INVENTION

Advances in electronics technology are leading to ever-smaller device designs with an ever-increasing variety of applications. Many "computing" devices, including handheld computers, Personal Digital Assistants ("PDA"), pagers, and cellular phones, are now small enough to be easily carried or even worn.

Highly miniaturized computing devices, such as handheld computers and PDAs, have significant operational limitations as a consequence of their small size. In particular, the computer-human interface is highly constrained: the small size greatly restricts possible approaches for data input. Traditional desktop computer-human interfaces, those that rely on keyboards and pointing devices, translate poorly to very small devices. Typically, PDAs lack a keyboard. Some handheld computer designs attempt to mimic desktop computer designs, however, only a miniature keyboard can be included.

In response to this problem, these computing devices generally provide for data input through a stylus and/or a limited number of buttons. Other miniature portable devices, such as pagers and cellular phones, typically rely on buttons for command input.

Newer approaches to the computer-human command submission interface have the goal of improving the interface for computers of all sizes. One approach is to employ tilt and/or translation sensors to achieve an alternate means of data input. In "Inertial Proprioceptive Devices: Self-Motion-Sensing Toys and Tools" by C. Verplaetse, IBM Systems Journal, Vol. 35, pg. 639 (1996), the author describes devices that are able to sense and react to their own position and orientation through use of embedded inertial motion sensors. The author further describes commercially available accelerometers and gyroscopes for use as inertial motion sensors in portable computing devices.

An implementation of the position and orientation sensing approach to data input is described in "Design of Spatially Aware Graspable Displays", by David Small and Hiroshi Ishii, CHI 97, pg. 367. The authors describe a large handheld or table positioned device that can be used to read a "newspaper" or other written document. Tilting of the device, in an intuitive manner, provides input commands for scrolling up or down, and left or right through the document: the graphical display responds to the angular orientation of the device. Translating the device closer to or further from the body of the user controls zooming of the document, in effect, scrolling in a third dimension. A button provides a "clutch" to lock and unlock the response of the display to user commands.

A much smaller prototype handheld device that also makes use of tilt for data input is described in "Tilting Operations for Small Screen Interfaces (Tech Note)" by Jun Rekimoto, UIST 1996, pg. 167 (1996). This device employs a combination of: 1) tilting for input of scrolling commands to move through text or an image; and 2) button pushing for input of activating commands for navigation through the display of text or to view a portion of an image in greater detail.

In addition to the problem of command input, small electronic devices typically must maximize the convenience of their portability and physical accessibility. Portable devices typically must be carried in a pocket, a bag, or by hand. During use, they typically must be held in a hand or placed on a surface while the fingers of the other hand provide data entry. This reduces the convenience of the portability of the computer, cellular phone, etc. Some physical designs provide for a wearable computer to improve portability and usability. U.S. Pat. No. 5,416,730, "Arm Mounted Computer" issued to Eric S. Lookofsky on May 16, 1995, provides for a three-sectioned computer which mounts to the forearm of the user with data entry via a keyboard. This approach frees one hand during operation of the device without requiring the device to be placed, for example, on a tabletop. U.S. Pat. No. 5,305,181, "Arm or Wrist Mounted Terminal with a Flexible Housing" issued to Darald R. Schultz on Apr. 19, 1994, similarly provides a wrist-mounted device with keyboard data entry and a display. U.S. Pat. No. 5,587,577, "Modular Scanner with Hand-Held Data Terminal" issued to Darald R. Schultz on Dec. 24, 1996, provides for a scanner unit mounted to the back of the hand/wrist as part of an inventory scanner device. Such wearable designs have the drawback of interfering with clothing and/or requiring the user to hold the arm in an awkward position during use.

In summary, the existing approaches for wearable device placement and data input have several difficulties. Operation and viewing the display screen can be awkward. The device can interfere with clothing. Further, such wearable devices continue to have the requirement of the use of fingers, typically via buttons or a stylus, for input of at least some types of commands and inconvenient positioning on a body and occupation of one or both hands of the user during command input. What is therefore desired is a wearable device with easy and conveniently positioned access that can readily use motion sensors for finger-free command input.

SUMMARY OF THE INVENTION

A handheld computing device is provided, the device comprising a motion sensor fixed to the device sensing an orientation of the device and means for mounting the device on a superior dorsal aspect of a hand. The device can include an enclosure shaped to conform to the superior dorsal aspect of the hand. The enclosure can be triangular-shaped with rounded vertices. The device can include a display screen for display of data. The means for mounting can include a glove.

The hand-mounted location of the motion sensor of the device permits input of position and gesture commands. The superior dorsal aspect location of the device further provides for a comfortable, relaxed position of the hand and easy viewing of a display screen built into the apparatus. The apparatus is readily available and avoids interfering with clothing, yet frees the fingers for fine or heavy work and need not be placed in a pocket or on a work surface.

BRIEF DESCRIPTION OF THE DRAWINGS

The following detailed description makes apparent other purposes and advantages of the invention, with reference to the drawings in which.

DETAILED DESCRIPTION OF PREFERRED EMBODIMENTS OF THE INVENTION

1. A Method For Use Of Gesture Commands

A method is provided for finger-free command or data input through hand movement. The method can supplement position command input via hand orientation or position. The following three sections (1a, 1b, and 1c) present: first, a description of gesture and position commands; second, a method for gesture command input; and third, examples of uses for gesture commands.

Note in the following that descriptions of hand movement and hand position are equivalent to descriptions of device movement and device position. It should be implicitly understood that the hand has attached to it a device that includes means for sensing movement and position, such as a motion sensor.

a. Description of comands

Commands that include hand movement are here termed gesture commands. In contrast, commands that are correlated to a particular angular orientation of a hand are here termed orientation or position commands. Position commands are given instantaneously, i.e. the position command given at any instant in time is equated to the position of the hand at that instant in time. Gesture commands are physically distinct from position commands: a gesture command requires an interval of time for submission by the hand. A gesture command comprises a time varying position expressed as a unique pattern of movement over an interval of time. A variety of gesture commands can be defined by use of different gesture movements, that is, different and repeatable patterns of movement expressed over an interval of time can be mapped to different commands.

Note the physically opposing yet complementary nature of position commands and gesture commands. A position command is submitted instantaneously: the position command at a given instant in time is simply a function of the position of the hand at that instant in time. In contrast, a gesture command requires an interval of time for submission: the gesture command is a function of a time varying position where the position varies during the interval of time. Position commands cannot be submitted in isolation. Motion through a range of positions is required to achieve a desired position of the hand. Thus, a series of position commands are submitted at the intermediate orientations that the hand passes through prior to the final desired position. In contrast, a gesture command can be submitted as a solitary event.

Figure 1:
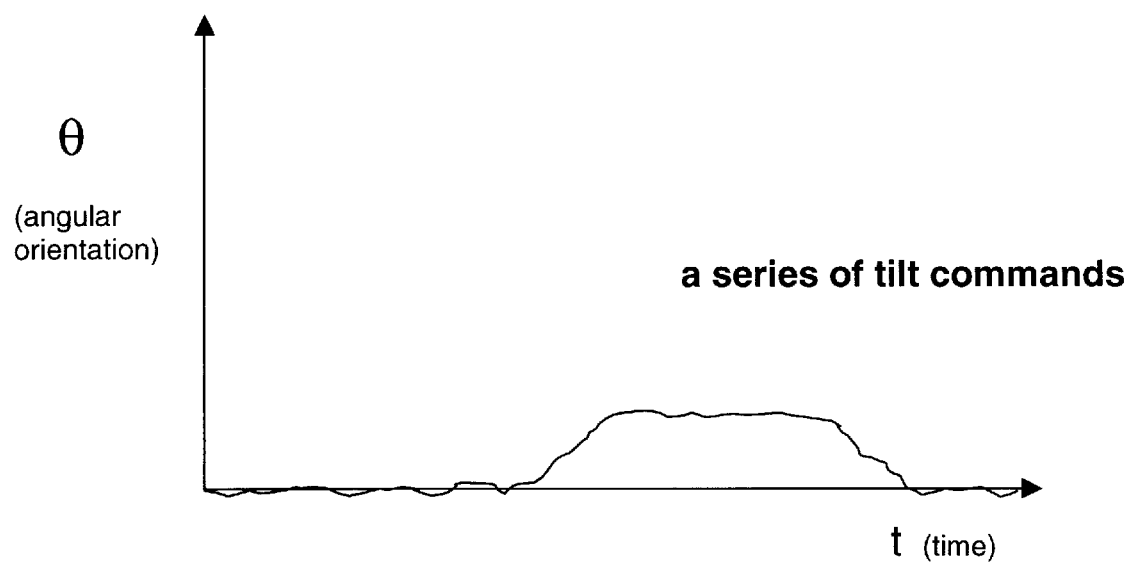
FIG. 1 is a timing diagram of a series of tilt commands.

A position command can comprise, for example, a fixed angular orientation relative to a particular axis of rotation. A gesture command can comprise, for example, an angular orientation that varies over an interval of time relative to a particular axis of rotation. FIG. 1 graphically depicts an example of a series of position commands submitted during a time sequence. A position command in this example corresponds to the angular orientation, $\theta$, about an axis of rotation. At each instant in time, the position command corresponds to the value of $\theta$ at that instant in time.

At the beginning of the time sequence in FIG. 1, the hand is oriented in a "neutral" position: the neutral position can be set at $\theta$ equal to zero or any preferred value. The neutral position is a rest position, that is, no command is submitted in the neutral position. The neutral position can be established in a number of ways. For a device that is receiving gesture commands, the position of the device at the time the device is turned on can be defined as the neutral position. Alternatively, the neutral position can be reset through submission of commands to the device.

As the time sequence progresses in FIG. 1, a series of position commands of increasing $\theta$ are submitted. The series of commands reach a plateau in the value of $\theta$ and eventually decrease in the value of $\theta$ as the hand returns to the neutral position. The fine scale undulations in the series of position commands represent the slight random movement or "noise" that would typically be exhibited by a hand.

Figure 2A:
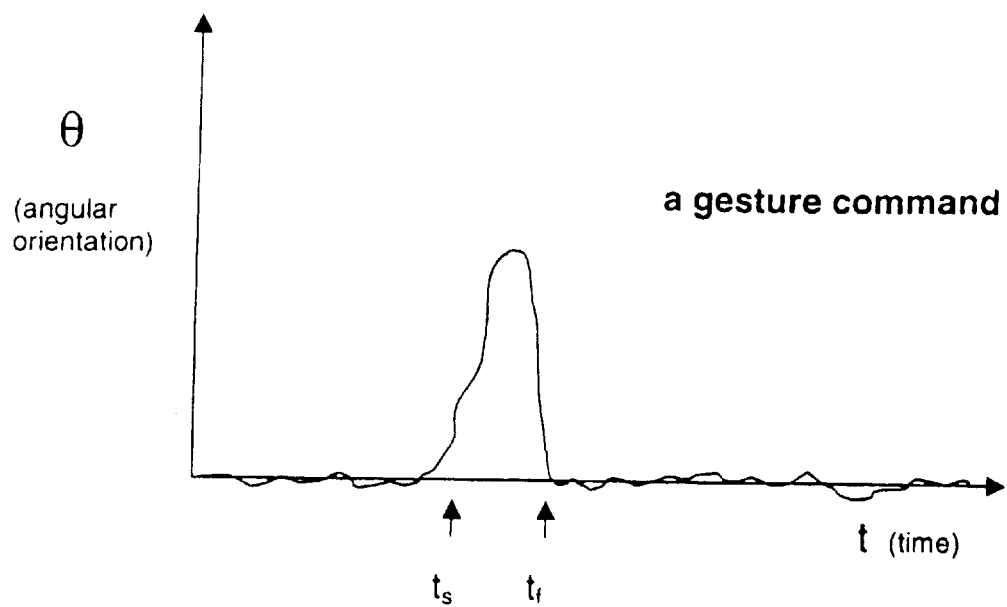
FIGS. 2a, b, c, and d are diagrams of example gesture commands in terms of angular orientation as a function of time.
Figure 2B:
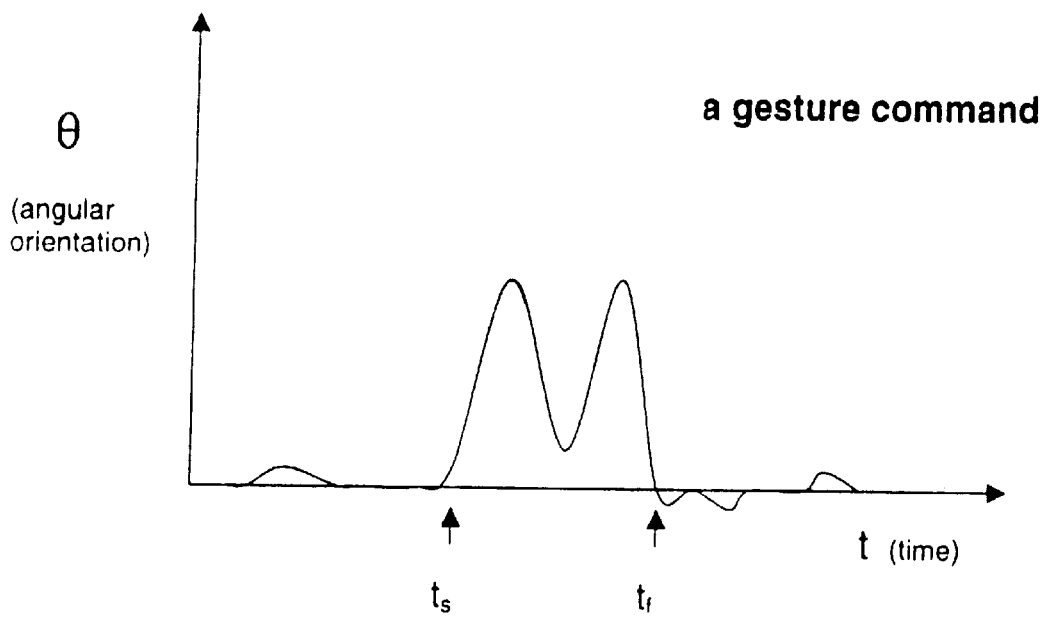
Figure 2C:
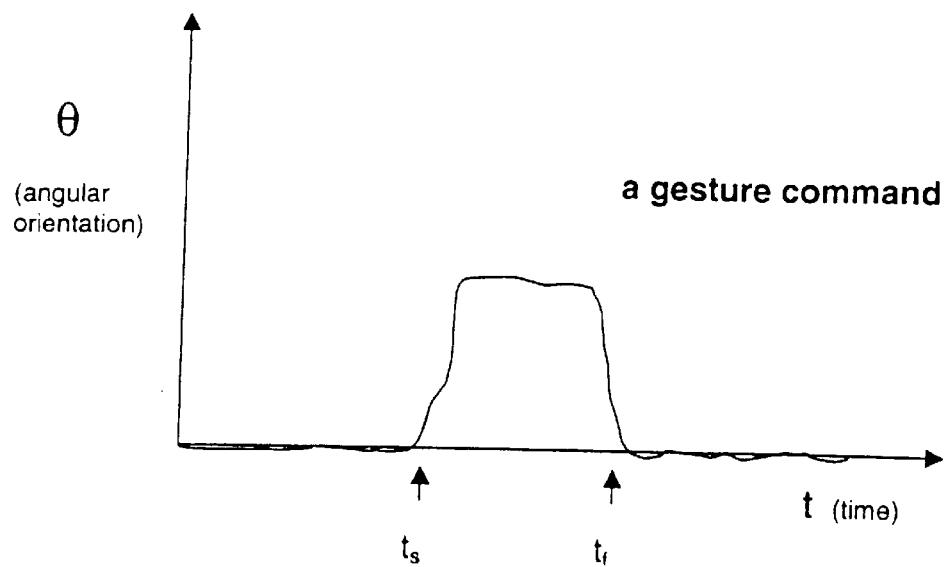
Figure 2D:
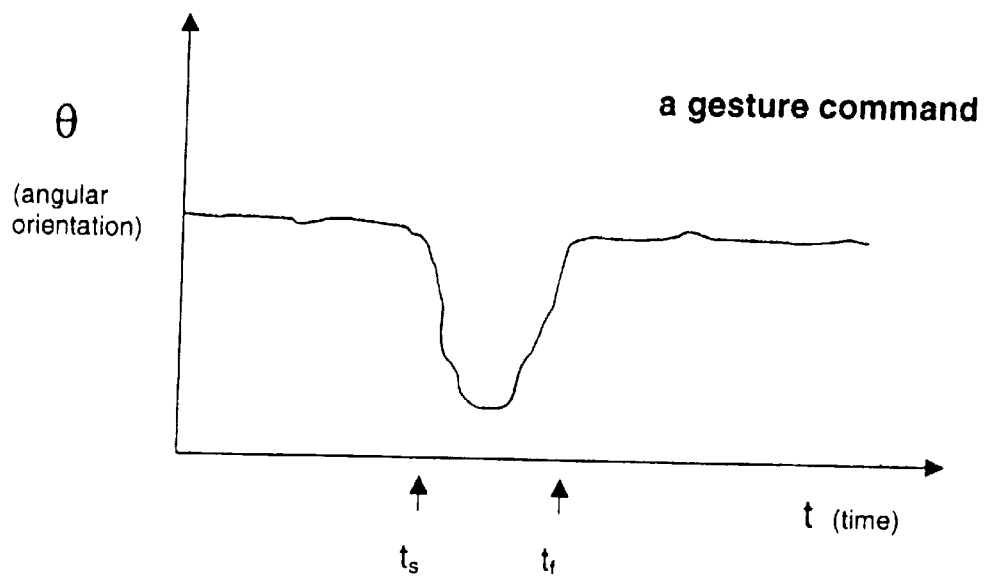

FIGS. 2a, b, c, and d show examples of four different, single gesture commands. Each of the example gesture commands is expressed over an interval of time commencing at $t_s$ and concluding at $t_f$ where the angular orientation about an axis of rotation varies during the interval of time. The example in FIG. 2a shows a gesture command that comprises a rotation in a positive angular direction followed immediately by a return approximately to the starting position. The example gesture command of FIG. 2b comprises a pattern of movement similar to that in FIG. 2a though repeated twice in immediate succession. FIG. 2c shows a gesture command that is similar to the command that is depicted in FIG. 2a though possessing a brief delay prior to returning to the starting angular orientation. Lastly, FIG. 2d shows a gesture command that commences with a movement in a negative angular direction. Note that the gesture commands of FIG. 2a and FIG. 2d have patterns of movement that are mirror images of each other. More generally, any pattern of movement has a related mirror image pattern of movement. Different patterns of movement, such as the four described above, can be correlated to different gesture commands. A computing device that makes use of gesture commands can employ different gesture commands to obtain different responses of the computing device.

The above-described position and gesture commands can be further 1o generalized. Position commands can correspond to angular orientations relative to any of three orthogonal axes. Gesture commands can correspond to a pattern of movement relative to one of the three orthogonal axes. More complex patterns of movement can include rotational movements about two or three of the three orthogonal axes. Hence, a great variety of gesture commands are possible.

b. Method for gesture command submission

Figure 3:
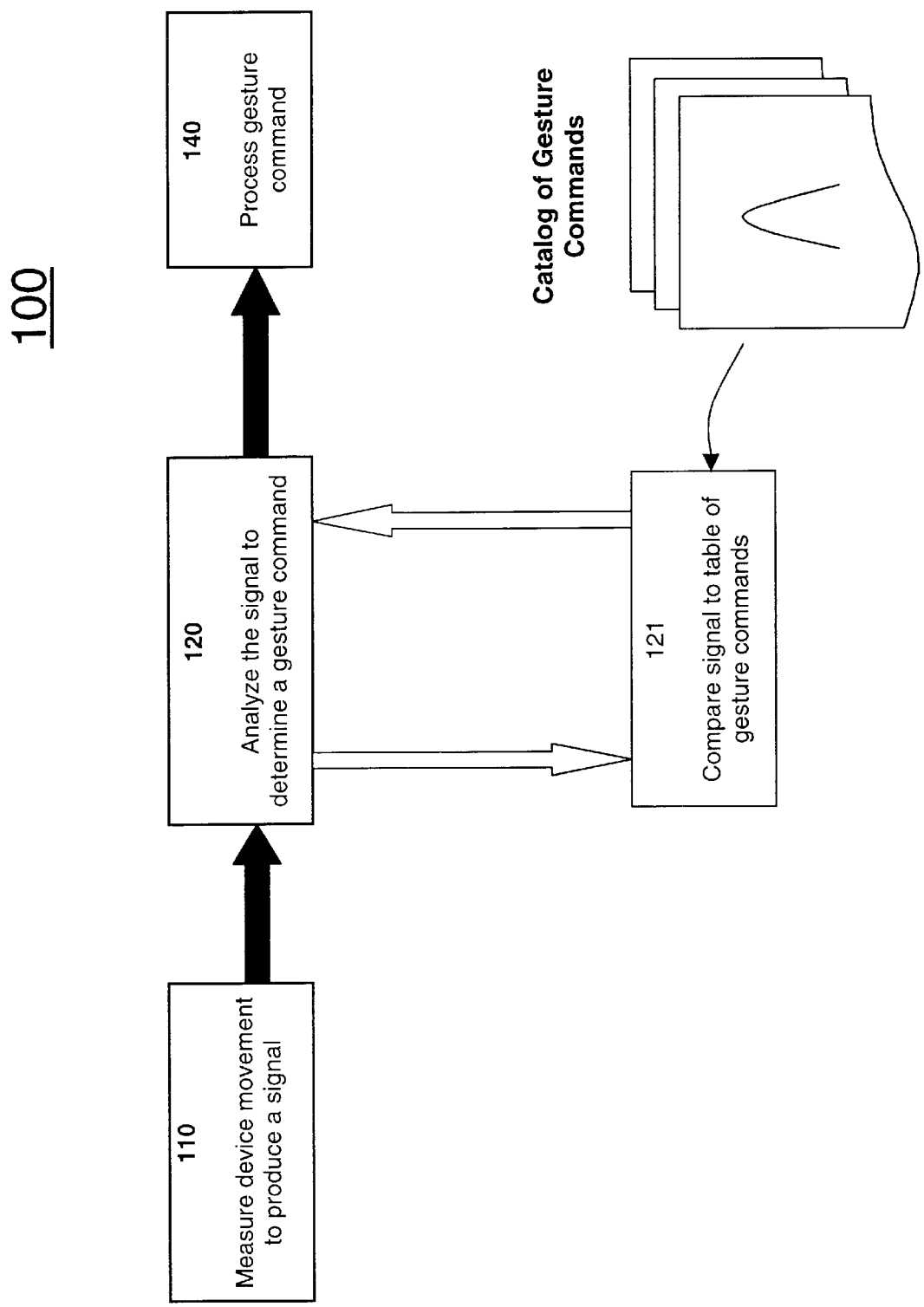
FIG. 3 is a flow chart of the steps for utilizing gesture commands.

FIG. 3 depicts steps 100 for input of gesture commands to a computing device. In step 110, movement of the computing device is measured over an interval of time. A motion sensor attached to the device measures the movement and generates a signal that corresponds to the movement. Analysis of the signal in step 120 determines if a gesture command was submitted during the interval of time.

If the computing device makes use of more than one gesture command, the particular gesture command that was submitted is determined in step 121. This determination is accomplished by comparison of the gesture that was submitted during the interval of time with a catalog of gesture commands. A match between the submitted gesture and a gesture command in the catalog serves to identify the submitted gesture command. Allowance is made for the minor variations in movement that are typically expected for repeated hand movements, i.e. a perfect match is not required to determine the gesture command.

In step 140, the gesture command is processed to control the computing device. The actions of steps 110 through 140 can be repeated to permit submission of a series of gesture commands.

A series of position commands can be submitted along with a series of gesture commands. A computing device can employ a single motion sensor to measure all commands or multiple motion sensors can be employed.

c. Examples of the use of gesture commands

Figure 4:
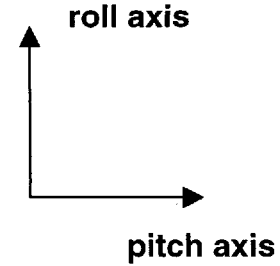
FIGS. 4a, b, and c depict a GUI that displays an address database: 4a shows a vertical list of the alphabet; 4b shows a list of names; and 4c shows the detailed address information for one individual in the database.

Different position and gesture commands can be employed to initiate different types of responses in a computing device. For example, position and gesture commands can be used, respectively, to initiate select and activate responses in a computer's GUI. A GUI that provides access to an address database serves as an example of a very simple implementation. FIGS. 4a, b, and c depict the appearance of the GUI in a computer display screen at three different moments in time. FIG. 4a shows the GUI displaying the alphabet in a vertical list. A highlighted "selection" band highlights the letter "E". The computer user scrolls through the alphabet until the desired letter is highlighted. During scrolling, the selection band can first move to the top or bottom of the list followed by scrolling of the list. Alternatively, the selection band can reside at a fixed location in the GUI with the text doing all the scrolling.

In response to a series of position commands, the list scrolls vertically. Preferably, as indicated, the scrolling position commands would be a function of angular orientation relative to the pitch rotation axis. The direction of scrolling, i.e. up or down, is determined by the angular orientation of a position command, i.e. whether the angular orientation is positive or negative. The neutral position, e.g. $\theta$ equal to zero, is determined as previously described.

In one alternative, the magnitude of $\theta$ determines the scrolling rate, as the table below shows.

| Tilt position | GUI scrolling rate |
|---|---|
| $\theta < \theta$ | none |
| $\theta_1 < \theta < \theta_2$ | stepwise |
| $\theta_2 < \theta < \theta_3$ | continuous; rate increases with $\theta$ |

To prevent a response to small movements, including noise, angular orientations of very small magnitude, $\theta < \theta_1$, are ignored. Angular orientations of a magnitude within a first angular range, $\theta_1 < \theta < \theta_2$, produce slow, stepwise scrolling, to ease selection of a particular letter. Angular orientations of a magnitude within a second angular range, $\theta_2 < \theta < \theta_3$, produce continuous scrolling with the rate of scrolling increasing with an increasing magnitude of the angular orientation.

Once the selection band highlights the desired letter, a gesture command, preferably about the roll axis, as indicated in FIG. 4a, serves to activate that letter. In the example of FIG. 4b, gesturing for the letter "S" shifts one level downward in the database hierarchy: the display then presents a vertical list of individuals whose last names begin with the letter "S". Scrolling through the name list proceeds, as above, via position commands until the desired individual's name is found and placed at the selection bar. A second gesture command activates the name, with the same sort of activation response as described above: a shift downward one level in the database hierarchy. The details of the individual's personal information are then displayed as depicted in FIG. 4c.

Many variants in the GUI's response are possible through the use of different gesture commands. For example, a clockwise fanning pattern of movement and a mirror image counterclockwise fanning pattern of movement can provide down-shift and up-shift activation commands. Gestures about a second axis, e.g. the pitch axis, can provide commands to lock and unlock the GUI, that is, responses by the GUI can be temporarily shutoff. In an alternative where two-dimensional lists of items are displayed, position commands relative to a second axis, preferably the roll axis, can be used to initiate horizontal scrolling of the lists. Activation of items through gesture commands can be accomplished as described for one-dimensional lists.

Alternatively, the various motion commands can provide a large range of responses in more sophisticated GUIs than those described above. GUIs with pull-down menus are accommodated with a similar command scheme. Scrolling in two-dimensions is again initiated through position commands about two axes until a desired menu item is highlighted. A gesture command then serves to activate or "open" the highlighted menu item. A highlighted selection bar within the pull-down menu can then be scrolled to a desired menu item and the item activated with a gesture command.

Figure 5:
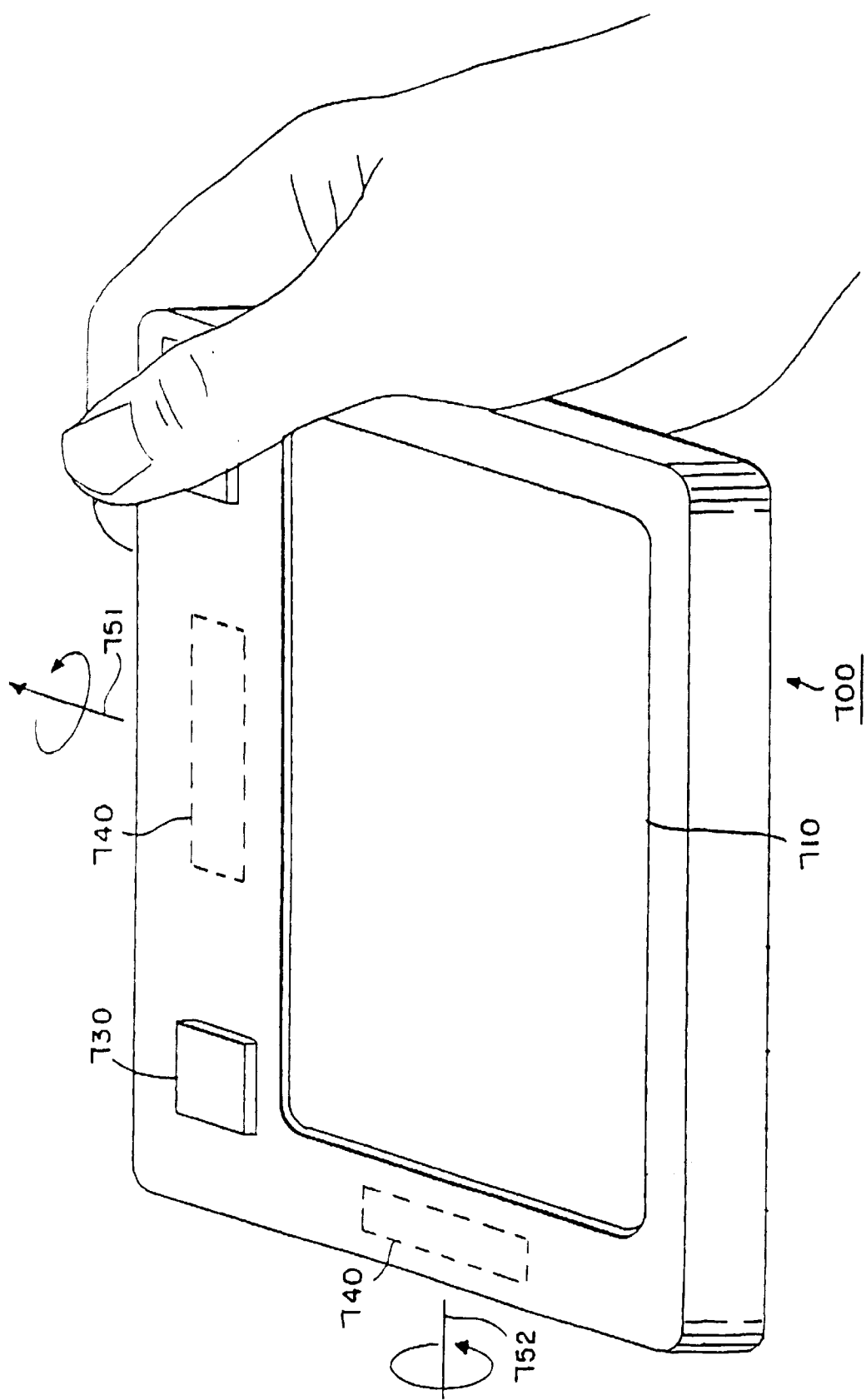
FIG. 5 depicts an image display device that is controlled via gesture commands.

An example of an image display device 700 that makes use of position and gesture commands is depicted in FIG. 5. The display device 700 is handheld and includes motion sensors 740 for receipt of position and gesture commands. The display device can include a button 730 as an on/off switch. The angular orientation of the display device 700 can be changed about the roll axis 751 and the pitch axis 752 for submission of position and gesture commands.

The display device 700 is used to observe images that are stored in a database. Scrolling position commands are used to scroll from image to image displayed on a display screen 710 until an image of interest is found. A gesture command then activates the displayed imaged for more detailed viewing. Additional gesture commands serve to "zoom" in to observe the selected image in greater detail or to zoom out to observe a greater portion of the image or the entire image. Position commands, again, serve to scroll the image across the display screen 710.

The above described method for input of gesture commands can be applied in the operation of a variety of computing devices, in particular, wearable versions of computing devices. Such devices include watches, televisions, radios, cellular phones, pagers, and two-way radios. For example, a cellular phone could be turned on and off and phone numbers selected and dialed, all without use of buttons. Further, gesture commands can be generalized to include translational movements in addition to rotational movements.

2. Speculative Execution Of Commands

As depicted in FIGS. 2a, b, c, and d, submission of a gesture command is initiated at time $t_s$. Complete submission of the gesture command, however, requires a finite interval of time $\Delta t$ equal to $t_f$ minus $t_s$. Therefore, the existence and identity of the command cannot be determined until an interval of time of length Δt after submission of the command begins. Confusion in command processing can occur during the interval of time. For example, a portion of a gesture command can be interpreted to be a series of position commands and acted upon as such prior to completion of the gesture command.

Figure 6:
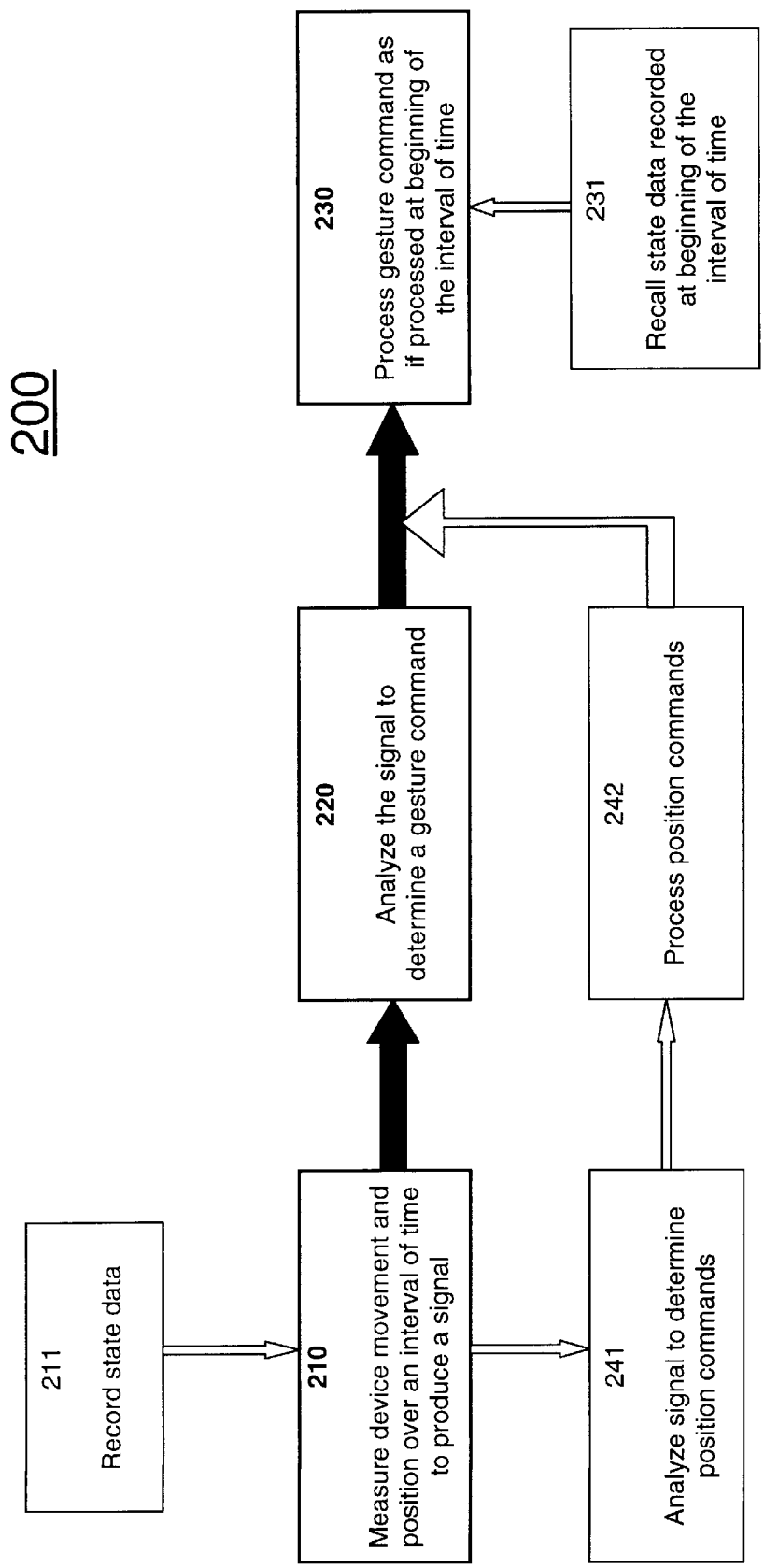
FIG. 6 is a flow diagram of the steps for speculative execution of a command.

FIG. 6 depicts the steps 200 in a method for speculative execution of commands. The method serves to produce an expected response in a computing device in response to submission of a gesture command. The method is also applicable to any command types that require an interval of time for submission.

At step 210, device movement is measured via a motion sensor attached to the device. A signal that corresponds to the movement is produced. At step 220, the signal that was produced during the interval of time is analyzed to determine if it corresponds to a gesture command. If a gesture command is determined at step 220, step 230 then occurs: the gesture command is processed as if it had been processed at time $t_s$.

Position commands can be utilized in parallel with gesture commands. In step 241, the signal is analyzed to determine a series of position commands. At step 242, each position command is processed upon determination. If a gesture command exists during the interval of time, the various orientations present in the gesture command may falsely be determined, at step 241, as position commands. The false position commands will then inappropriately be processed at step 242. The confusion is corrected at step 230. By processing the gesture command as if it had been processed at the beginning of the interval of time, the effects of the false position commands are rejected. That is, the gesture command controls the device as of the orientation that existed at the time $t_s$.

Steps 211 and 231 as shown in FIG. 6 indicate one implementation of the above method. At step 211, the state of the device is recorded. Recording is done continuously. At step 231, recorded state data of the device is provided for the processing of the gesture command performed at step 230. State data that was recorded at time $t_s$ provides a reference for the appropriate processing of the gesture command in step 230.

A simple example of the recording of state data can be given with reference to FIG. 4a. A series of position commands would cause scrolling of the alphabet that appears in the GUI displayed in FIG. 4a. As the display scrolls, the state of the display would be recorded over time. That is, the letter that was highlighted at a particular point in time in the past could be determined by recalling the recorded data for that particular point in time. After submission of a gesture command, the gesture command could then be correctly applied to the letter that was highlighted at the beginning of the gesture command by recalling the state data for that time.

3. Button Free Wearable Computer

Figure 7:
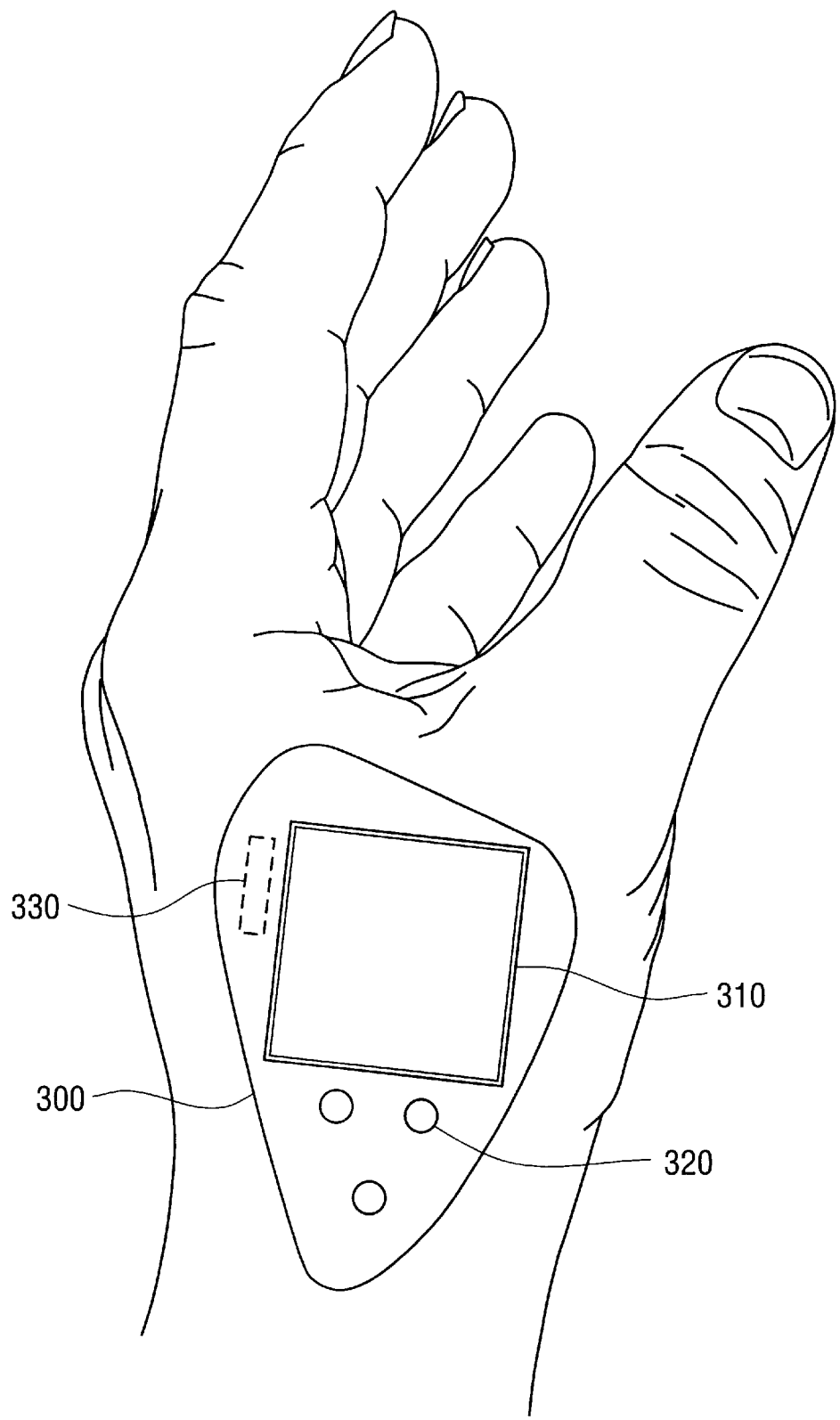
FIG. 7 depicts a wearable computer mounted to a superior dorsal aspect of a hand.

FIG. 7 depicts a wearable computer 300 mounted on a superior dorsal aspect of a hand. The wearable computer 300 includes a motion sensor 330. The wearable computer 300 is handheld in the sense that it is mounted to the hand. With this mount location, convenient wrist and forearm rotational movements can be used to move the computer 300 about three orthogonal axes of rotation. Thus, a variety of position and gesture commands can be easily submitted to the wearable computer 300. A range of command input is available, through use of gesture commands, without recourse to buttons or other options that would require use of fingers.

The computer 300 can include a display screen 310 for display of data such as the GUI described above in Section 1 part c. Alternatively, the display screen 310 can display the image database described above in Section 1 Part c. Given the superior dorsal aspect location of the display screen 310, the display screen 310 is readily visible and conveniently located. The wearer can observe the display screen 310 with the wearer's hand held in a comfortable position and without interference from typical clothing. The fingers of the hand are free for other activities, such as holding a pen. Buttons 320 can be included in the computer 300 to provide alternative options for button entry of commands, e.g. on and off commands.

In one embodiment, as depicted in FIG. 7, the components of the wearable computer 300 are housed in an enclosure that possesses an approximately triangular shape with rounded vertices to conform to the superior dorsal aspect portion of the hand. The underside of the enclosure can further be shaped to conform to the surface of the superior dorsal aspect portion of the hand. Soft or flexible material can be employed in the enclosure to increase the comfort of the user. Further, the material can be textured or colored to disguise the presence of the computer 300 on the user's hand.

Alternative locations for the wearable computer can be envisioned. Placement on a foot would still permit movement about three axes as would placement on a head. Thus, an individual with diminished use of arms or arms and legs would have other options for interaction with a computing device through body movements. Placement at other locations on a hand would still permit movement about all three axes though without the convenience specific to the superior dorsal aspect location.

Figure 8:
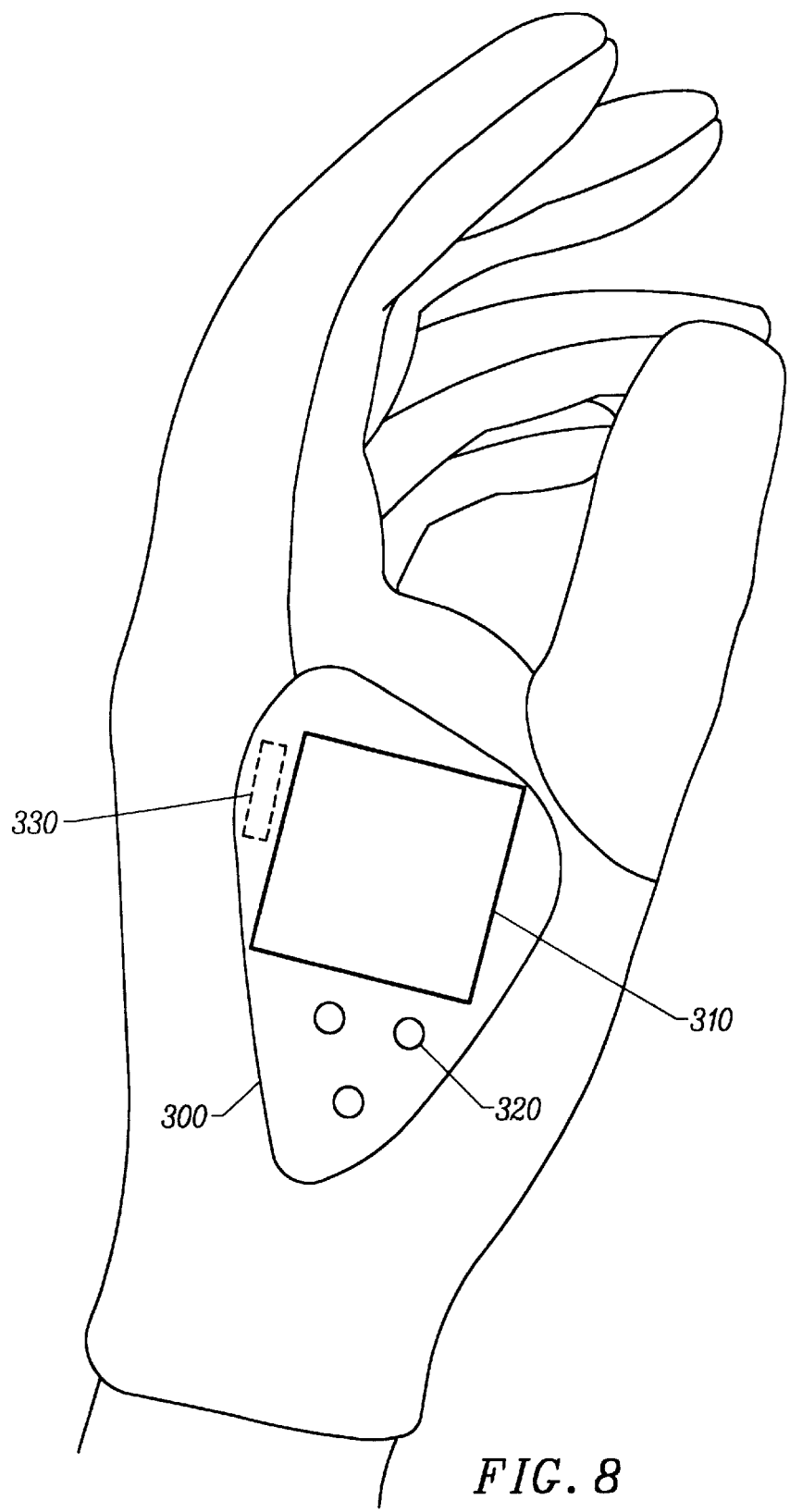
FIG. 8 depicts a wearable computer built into a glove.

The mount that positions the wearable computer 300 at the superior dorsal aspect location can include various features, such as: straps; an adhesive; suction cups; a ring; a bracelet; or the computer 300 can be built into a glove as shown in FIG. 8.

Alternatively, components of the wearable computer 300 can be placed at different locations on or off of the body. For example, the motion sensor 330 can be mounted to the superior dorsal aspect of the hand while the display screen 310 is mounted elsewhere on the body or is placed off of the body.

Rather than a computer, the wearable device alternatively can be one of a variety of computing devices, e.g. a cellular phone, a pager, a two-way radio, or a multifunction wristwatch. If included, the display screen 300 can display data relevant to the particular computing device.

The above embodiments are merely illustrative. Those skilled in the art may make various modifications and changes that will embody the principles of the invention and fall within the scope of the invention.

I claim:

1. A handheld computing device, comprising:
   at least one motion sensor fixed to the device sensing an orientation of the device; and
   means for mounting the device on a superior dorsal aspect of a hand, so as to mount the device entirely within a triangular region between a thumb and second finger of the hand;
   the at least one motion sensor for generating signals associated with movement of the hand representing gesture commands.

2. The device of claim 1 including an enclosure shaped to conform to the superior dorsal aspect of the hand.

3. The device of claim 1 including a triangular-shaped enclosure with rounded vertices.

4. The device of claim 3 including a display screen for display of data.

5. The device of claim 4 wherein the means for mounting includes a glove.

* * * * *